US012453370B1

(12) United States Patent
Hendrickson

(10) Patent No.: US 12,453,370 B1
(45) Date of Patent: Oct. 28, 2025

(54) PORTABLE FLIP TOP APPARATUS UTILIZING THE LATERAL KEYWAY SPRING HINGE FOR STOWING TOBACCO, PARAPHERNALIA, OR ASSORTED INGREDIENTS

(71) Applicant: Eric Roy Hendrickson, Saint Peter, MN (US)

(72) Inventor: Eric Roy Hendrickson, Saint Peter, MN (US)

(73) Assignee: E. Roy Hendrickson, Saint Peter, MN (US)

( * ) Notice: Subject to any disclaimer, the term of this patent is extended or adjusted under 35 U.S.C. 154(b) by 0 days.

(21) Appl. No.: 19/073,995

(22) Filed: Mar. 7, 2025

(51) Int. Cl.
*A24F 9/16* (2006.01)
*E05F 1/12* (2006.01)

(52) U.S. Cl.
CPC .............. *A24F 9/16* (2013.01); *E05F 1/1215* (2013.01)

(58) Field of Classification Search
CPC .. A24F 9/16; A24F 15/00; A24F 15/01; A24F 23/04; B65D 85/109; E05F 1/1215
USPC ........................................... 206/242; 361/600
See application file for complete search history.

(56) References Cited

U.S. PATENT DOCUMENTS

| | | | | | |
|---|---|---|---|---|---|
| 1,341,295 | A * | 5/1920 | Burtis | A24F 23/04 | 206/267 |
| 4,281,761 | A * | 8/1981 | Olazabal | A24F 15/18 | 206/268 |
| 5,832,935 | A * | 11/1998 | Heine | A24F 1/00 | 131/226 |
| 5,967,312 | A * | 10/1999 | Jacobs | A24F 23/04 | 206/242 |
| 8,408,390 | B2 * | 4/2013 | Rennecamp | A24F 15/18 | 206/268 |
| 2014/0299492 | A1 * | 10/2014 | Liu | A24F 15/01 | 206/264 |
| 2016/0091194 | A1 * | 3/2016 | Liu | A24F 40/95 | 206/265 |
| 2016/0120218 | A1 * | 5/2016 | Schennum | A24F 15/12 | 206/268 |
| 2020/0029622 | A1 * | 1/2020 | Fei | F16J 15/02 | |
| 2021/0120870 | A1 * | 4/2021 | Zhu | A24F 40/10 | |

* cited by examiner

*Primary Examiner* — Rafael A Ortiz

(57) ABSTRACT

A flip-top portable apparatus intended to contain organic smoking material, paraphernalia, cosmetics, or ingredients. The apparatus is fashioned with a body and lid connected together with a spring hinge or biasing element. An improved slidably operated cover is located on a lateral surface and is held securely in a closed position by the spring hinge lid. Urging the slidably operated cover to an open position will gain access to the storage chamber of the apparatus. The novel idea is that, in this arrangement, when the improved slidably activated cover is opened enough to reveal the storage chamber, the open spring hinge lid biases against the open cover and holds the cover in the selected position and, consequently, the apparatus is more stable than others when open. An included disclosure for an improved spring hinge design also featured in the specification.

1 Claim, 16 Drawing Sheets

FIG. 5
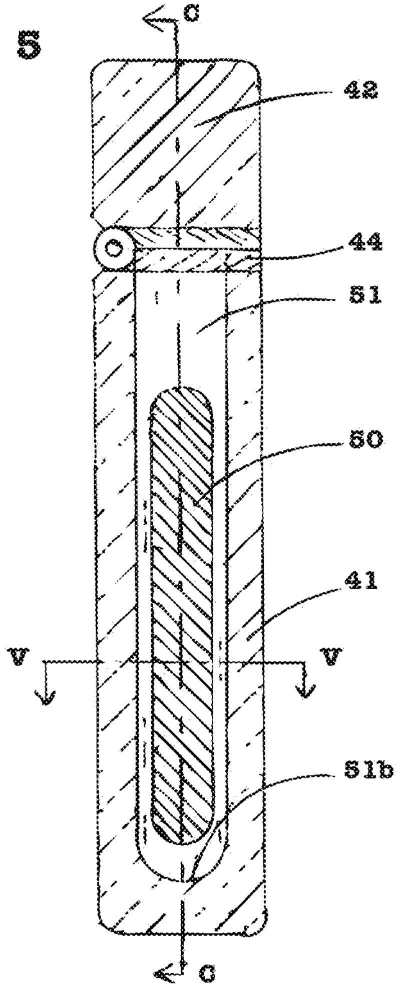
FIG. 4
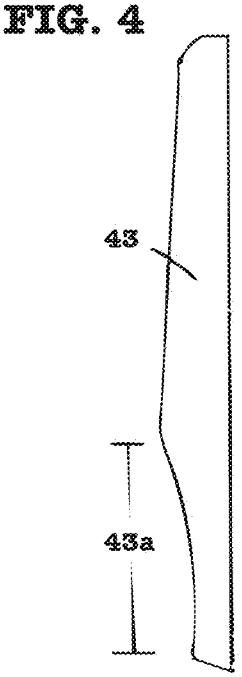
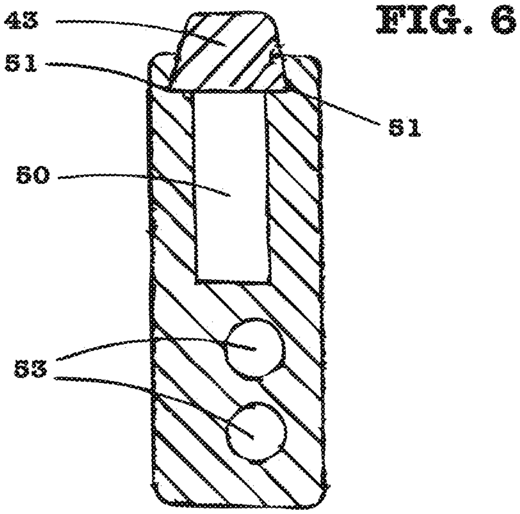
FIG. 6

FIG. 17
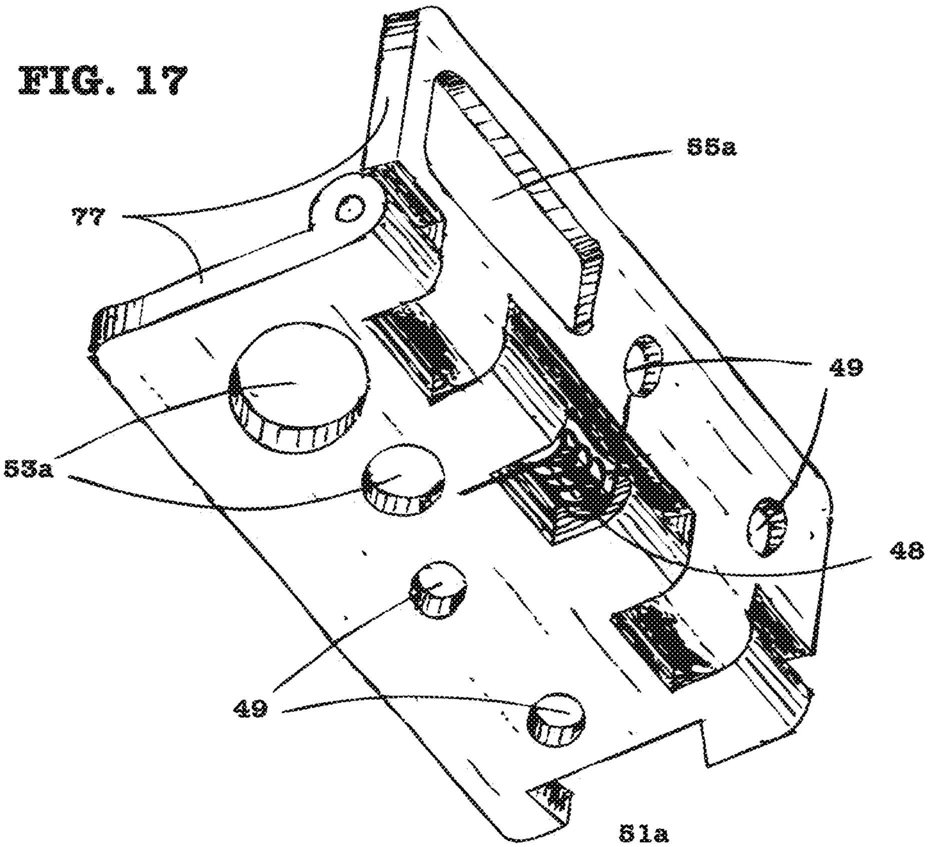
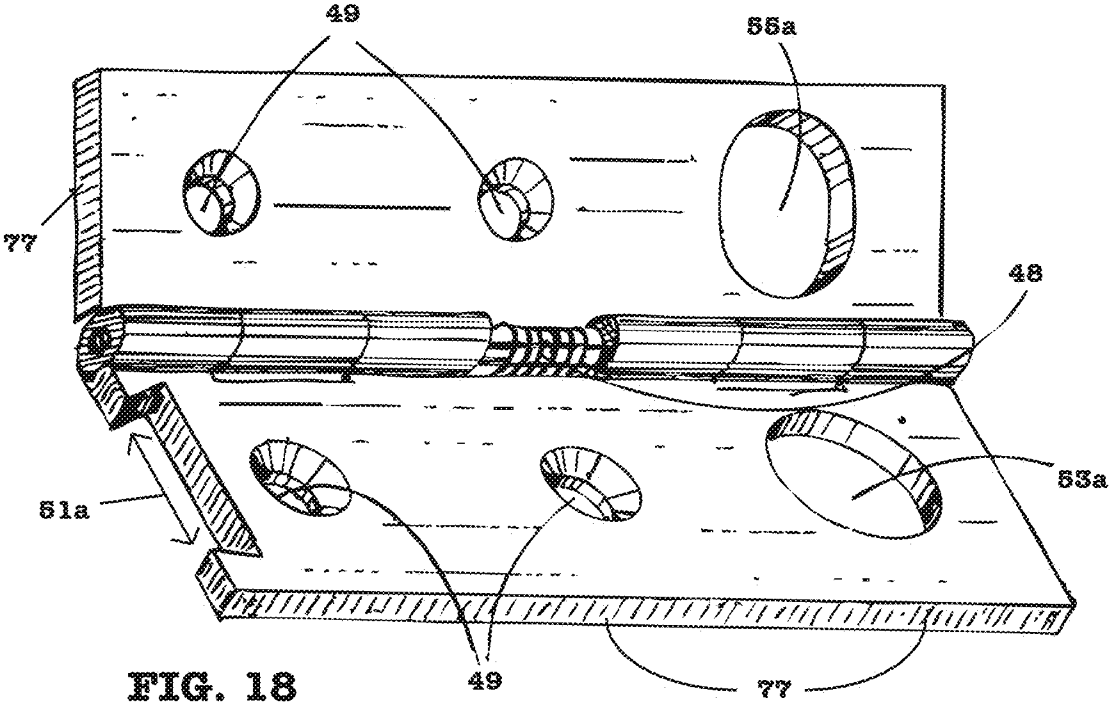
FIG. 18

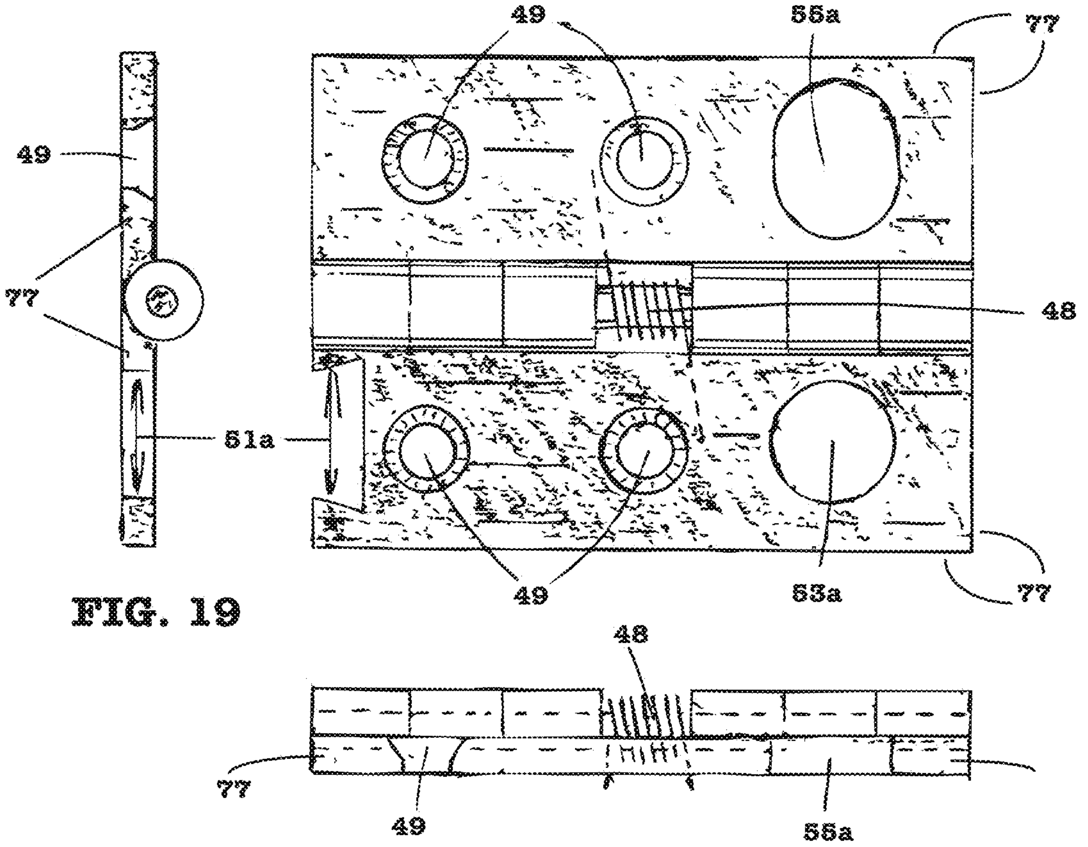
FIG. 19
FIG. 20
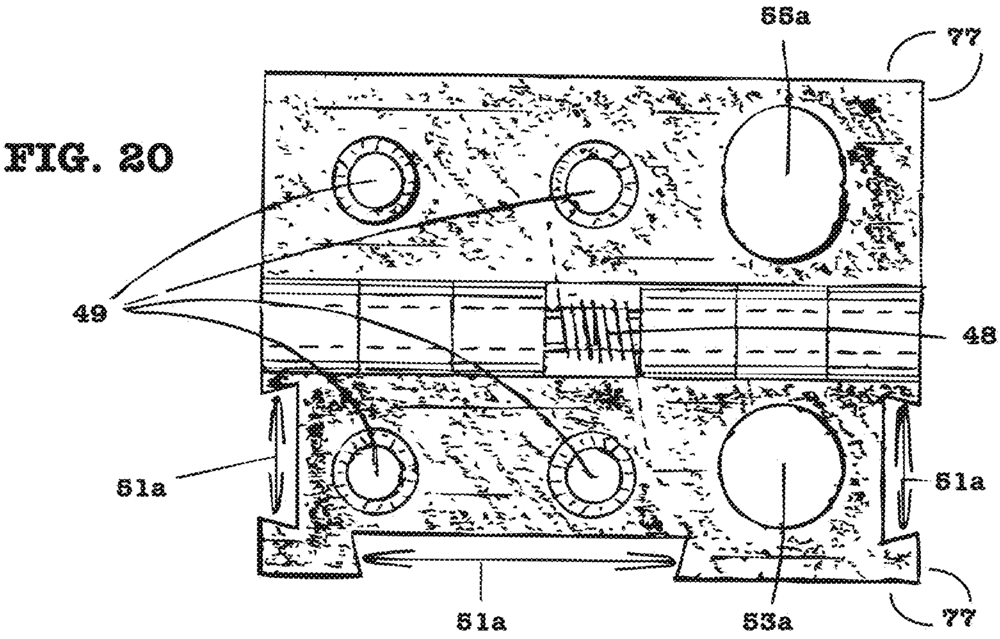

FIG. 25
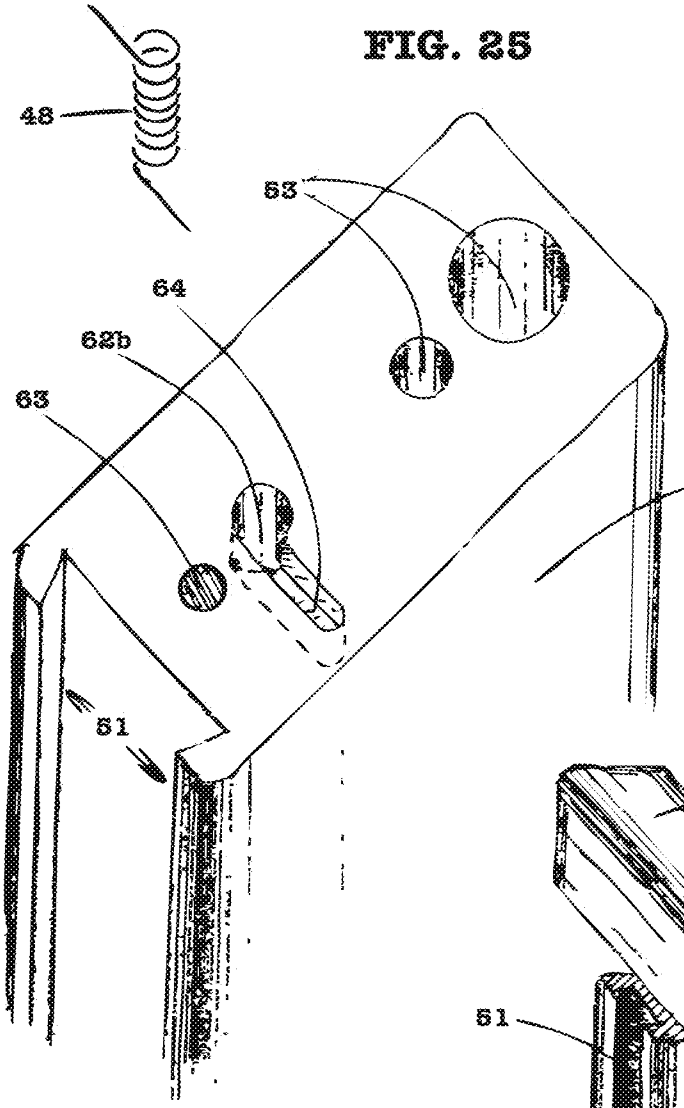
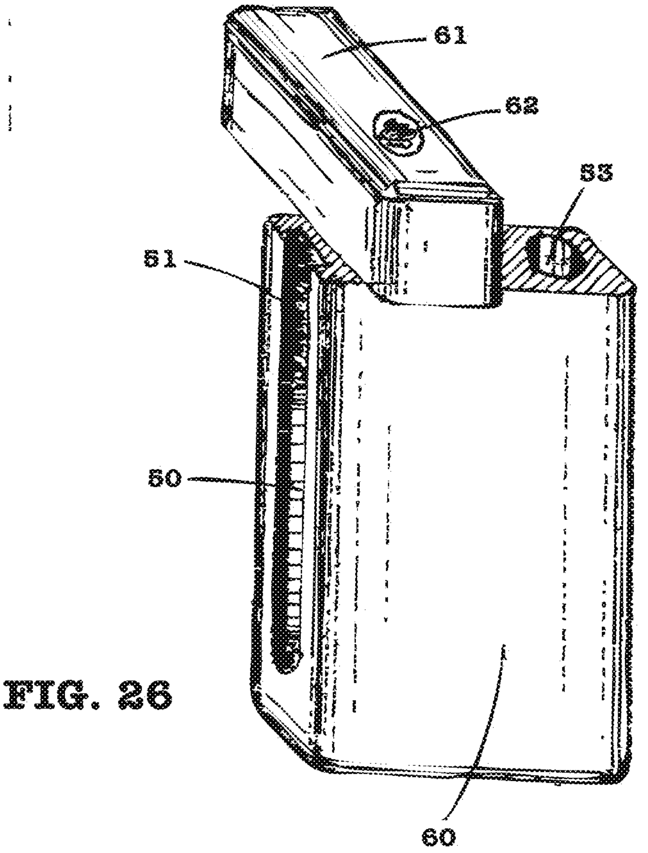
FIG. 26

PORTABLE FLIP TOP APPARATUS UTILIZING THE LATERAL KEYWAY SPRING HINGE FOR STOWING TOBACCO, PARAPHERNALIA, OR ASSORTED INGREDIENTS

BACKGROUND OF THE INVENTION

Field of Endeavor

Relating to apparatuses, paraphernalia, and accessories for accommodating organic tobacco and ingredients of the sort, the present disclosure aims to forward the experience regarding storage and implementation.

Prior Art

History has several acclaimed smoking apparatuses that have had patents awarded. Notably, the Smoking System U.S. Pat. No. 4,214,658A patent duly awarded to Crow set forth a slide top apparatus that was suitable in the past. Further embodiments would follow; a few examples: U.S. Pat. No. 5,465,738A (Rowland), U.S. Pat. No. 8,408,390B2 (Rennecamp), and U.S. Ser. No. 10/028,527 (Jordan). These best examples, along with other embodiments, may have complicated latches that are prone to accidental triggers; some have more than one spring or tricky mechanisms, adding difficult complexity. Sliding covers have been cumbersome to index and slide, even getting lost. Lids can be loose or unable to securely hold an open or closed position. Some apparatuses possess less than perfect ways to confine the smoking product. Additionally, these embodiments, when placed upon a table top or surface of the like, underachieve in inherent stability compared to this current exhibit when presented in an open position.

A new and useful means can be practiced with the present invention whereby the spring hinged lid does not have a latch but securely contains all the product and accessories therein. The inherent stability when in an open position and uncomplicated utilization will also lend to an advantageous experience when portability is desired. If favored or it becomes useful as the only option because of one's circumstances, the apparatus may be opened, manipulated, and placed upon a tabletop or surface of the like using only one hand.

US 721A Helical Spring Joint Hinge (year 1838) pioneered early spring hinge designs. Many different embodiments concerning the spring, hinge knuckles and related actions have been proposed and patented; the hinge leaf has limited prior art except for ornamental qualities. The included improvement has a specific function concerning the use and purpose of the spring hinge assembly in this circumstance.

The Twist Top embodiment discussed and disclosed is related to several patented apparatuses; most especially U.S. Pat. No. 5,967,310 (Hill), U.S. Pat. No. 6,474,342 (Rennecamp), and U.S. Pat. No. 6,736,143 (Rennecamp). These fine examples share the twist top action but lack the lateral slide cover intended to make the apparatus more stable when in an open position.

SUMMARY OF THE DISCLOSURE

The present invention pertains to a flip-top apparatus purposed to contain organic smoking material and smoking accessories. This invention introduces an improved storage container for the operant to experience and has been conceived to obviate the disadvantages of previous apparatuses. A new and useful novelty is presented in this disclosure by way of avoiding lost slidable covers, complex designs, inadvertent latch releases, and unstable receptacles that tip over too easily.

The body of the smoking product/accessory apparatus has an upper surface revealing a keyway opening extending along a lateral surface. Within the keyway is a chamber for storing product such as organic tobacco or related ingredients. A lateral cover slides into the keyway opening, fitting all the way to the keyway endpoint and enclosing the product. A lid with a spring hinge compelled to close is attached to the upper surface of the body, securely locking the lateral slidable cover in a closed position.

For the apparatus to present an open position, the spring hinge lid is held open and the lateral slidable cover is not removed from the keyway but slid to a selected open position. The spring hinge lid is released to wedge against the lateral slidable cover, propping the lid and cover both to an open position. This important sequence results in a locked open fixed stable position of the apparatus. With the apparatus in this open position and the storage chamber aperture in an 'up' orientation, a wider footprint of the apparatus is realized and a lower center of gravity is now achieved. When the apparatus is placed upon a table, countertop, or surface of the like, the wider footprint combined with the lower center of gravity culminate in a stably superior apparatus.

On the body's upper surface there is the option of none, one, or several purposely sized boreholes, or cavities, into which any accessories used for smoking (e.g., pipes, pipe cleaners, pipe filters, and related paraphernalia) may be stored. These objects protrude above the upper surface for convenient accessibility and for that reason a recess is provided in the hinged lid. Several embodiments of the disclosed invention exist to coincide with the preference of the operant on how many cavities, if any, and storage chambers are desired.

The apparatus can single-handedly be grasped and opened with savvy proficiency: the lateral slidable cover includes a concavity designed to fit one's thumb (or finger, or the like thereof) to urge the cover open and as the cover is being opened it urges the spring hinge lid open. Keep sliding and stop at a selected position and now the apparatus is open, ready for use. If the lateral slidable cover is removed from the apparatus, the lateral slidable cover can assist with depositing, tamping, stirring, or removing the organic smoking material located in the storage chamber.

By virtue of the spring hinge lid always under tension, the present invention has an improved means to securely hold the lateral slidable cover in place whether in a closed or open position; no latches. The apparatus is easier to open using the cover concavity, and when locked open this invention has an augmented stability and an improved means to hold the lateral slidable cover in place while accessing the product located in the storage chamber—a simplicity not realized by others of the sort.

An improved spring-loaded hinge utilizing a lateral keyway invention developed to prevent damage to the keyway is also included in this disclosure. The lateral keyway opening on the hinge leaf will add steadfastness and dependability to the apparatus; the title Lateral Keyway Spring Hinge has been assigned to this invention.

Other embodiments, including magnet implementation and a twist-top version are also disclosed to suit the operator's desires. These second embodiments also share the features and betterments of the preferred embodiment supplying the fundamental basis for this disclosure: the lid of the apparatus includes a biasing aspect intended to wedge upon the slidable cover located in a keyway of the apparatus to hold an open position. A resulting augmented stability aspect confirms a distinguished instrument to be practiced.

BRIEF DESCRIPTION OF THE DRAWINGS

FIG. 4: Profile view of storage chamber cover.

FIG. 5: View of a lateral surface with cover removed. Sectional Lines C-C and V-V are depicted.

FIG. 6: Cross-section top view along section line L-L of FIG. 3*a*.

FIG. 17: Perspective viewing the preferred embodiment of the Lateral Keyway Spring Hinge.

FIG. 18: A second embodiment perspective of the Lateral Keyway Spring Hinge.

FIG. 19: Primary multiview of the Lateral Keyway Spring Hinge.

FIG. 20: Top view of an open ancillary Lateral Keyway Spring Hinge embodiment.

FIG. 25: Partial view of Twist Top embodiment upper surface.

FIG. 26: Twist Top embodiment in open position.

DETAILED DESCRIPTION

As vastly numerous smoking pipes and accessories are commonly available, this disclosure does not attempt to define a certain size, type or style of smoking pipe or smoking pipe accessory but does define an apparatus for storing these utensils/accessories, and product, in a simple, convenient, portable receptacle. The included smoking pipe and included accessories that appear in the illustrations are for making clear the intention at hand. Additionally, the invention may instead be used to stow a small quantity of ingredients, trivial objects, or constituents of the like.

Going into detail with all the aspects of this exhibit, we start with a pocket sized apparatus with essentially four components that make up the preferred embodiment and lay the groundwork for further detailing the apparatus in full: Body, Lid, and Storage Chamber Cover are generally composed of a suitable natural (e.g. wood) or synthetic material; and the fourth component, the Spring Hinge, is generally made of a suitable metal such as brass or steel.

Figure 1:
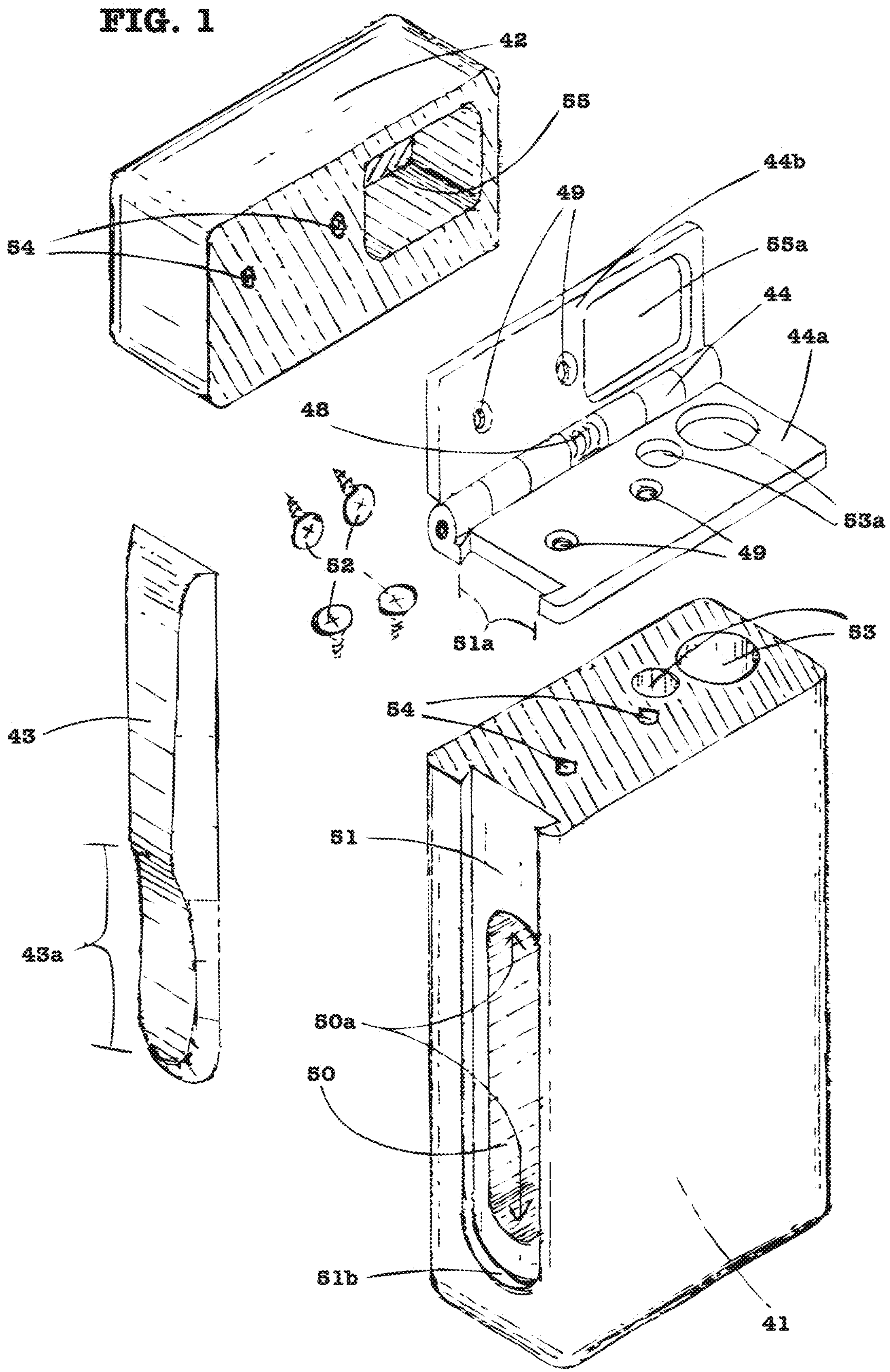
FIG. 1: Exploded perspective of the preferred embodiment.

Going on to establish a descriptive orientation and apply reference numerals to the basic components, the exploded view in FIG. 1 gives way to an understanding of the manufacture and assembly of the apparatus. Located and machined on a Body (41) lateral surface: Keyway (51), most commonly machined having a dovetail profile and terminating at Keyway Endpoint (51*b*), is intended to receive Storage Chamber Cover (43). Keyway (51) is circumjacent to Storage Chamber Opening (50*a*) which leads to the machined Storage Chamber (50). The upper surface of Body (41) has Pilot Holes (54) bored to an appropriate diameter and depth; Accessory Cavities (53), if any are desired to be included, are bored to appropriate dimensions. The lower surface of Lid (42) has Pilot Holes (54) bored to an appropriate diameter and depth; Recess (55) is A machined to appropriate dimensions if any accessories are desired to be included. A suitable natural or synthetic material is located and machined to have a complimentary profile of the Keyway (51) and Keyway Endpoint (51*b*), creating Storage Chamber Cover (43) including Cover Concavity (43*a*) therein. The remaining elements of FIG. 1 are the Lateral Keyway Spring Hinge (44) components: Hinge Leaf (44*a*) with Screw Holes (49), included Accessory Cavity Openings (53*a*), and importantly, Keyway Opening (51*a*). Also portrayed are Hinge Leaf (44*b*) with Screw Holes (49) and included Recess Opening (55*a*). Screw Holes (49) are appropriately sized and line up with Pilot Holes (54). Torsion Spring (48) is located. Hinge Screws (52) are received in to their respective Screw Holes (49) and Pilot Holes (54) to mount Lateral Keyway Spring Hinge (44) to the Body (41) and Lid (42). Further description of the Lateral Keyway Spring Hinge follows in this disclosure.

Figure 2A:
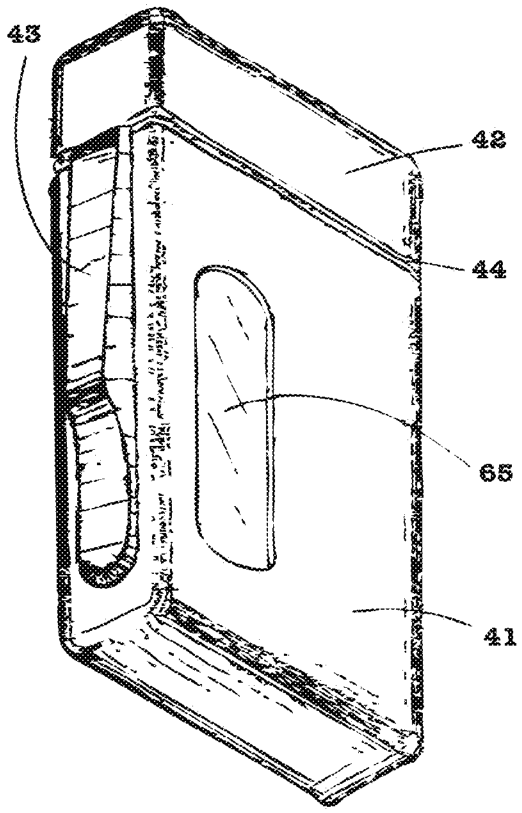
FIG. 2*a*: Perspective of the front of the apparatus.
Figure 2B:
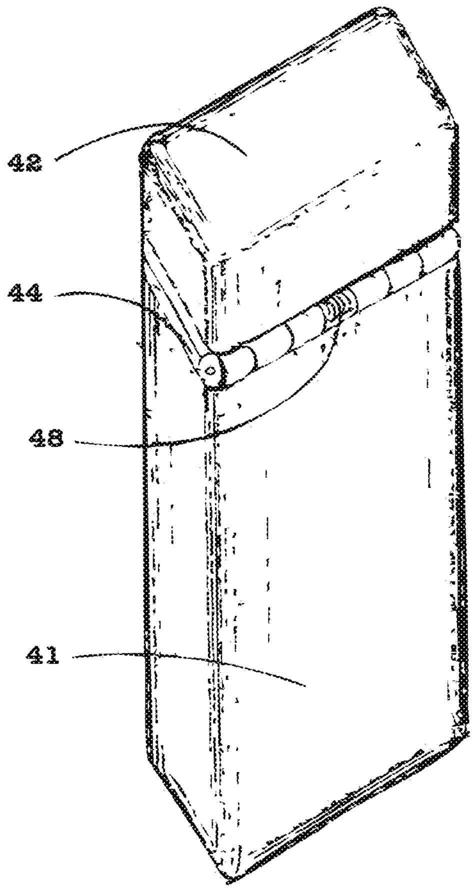
FIG. 2*b*: Perspective of the rear of the apparatus.
Figure 3A:
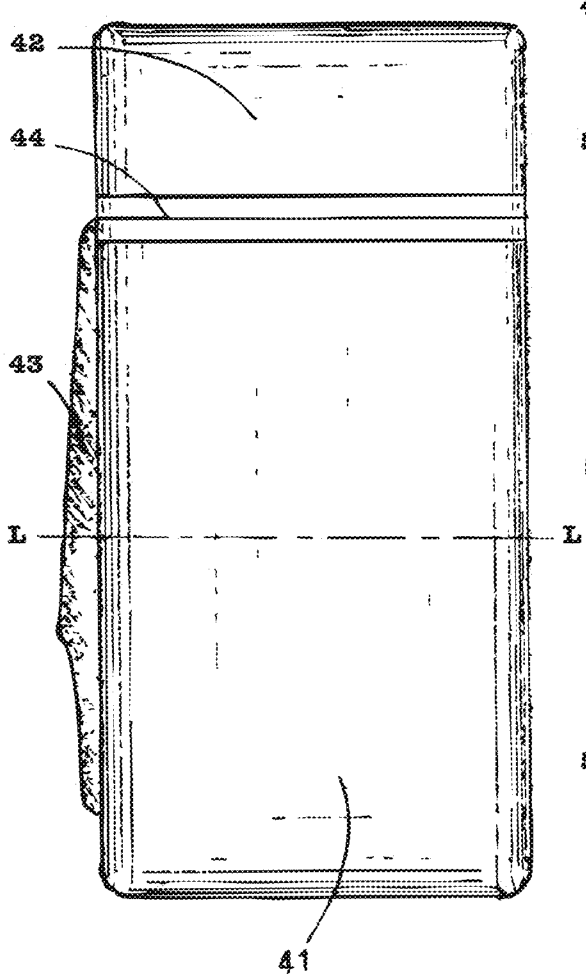
FIG. 3*a*: Frontal view of the preferred embodiment. Sectional Line L-L is discerned.

FIGS. 2*a*, 2*b*, and 3*a* are respectable examples of the finished product. Lateral Keyway Spring Hinge (44) has an appropriate resilience and continually urges Body (41) and Lid (42) to a closed position. FIG. 2*a* also shows Storage Chamber Cover (43) and optional Viewing Window (65). FIG. 2*b* adds a portrayal of the Torsion Spring (48) and in FIG. 3*a* Storage Chamber Cover (43) profile can be identified and studied; FIG. 3*a* includes sectional line L-L.

Figure 3B:
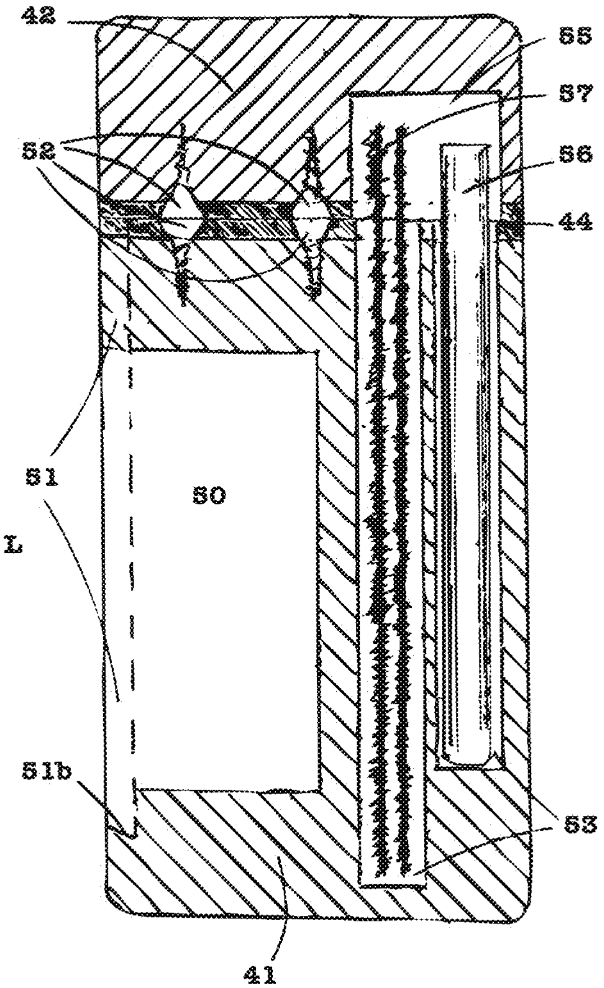
FIG. 3*b*: Along section line C-C of FIG. 5, a cross-sectional aspect depicting the inside of the inventor's apparatus.

FIG. 3*b*: Along sectional line C-C of FIG. 5, a sectional aspect depicting the interior of the inventor's apparatus with Lid (42) in a closed position and storage chamber cover removed from Keyway (51). Hinge Screws (52) fitted to secure Lateral Keyway Spring Hinge (44) to the respective components, Body (41) and Lid (42). Included Accessory Cavities (53) and included Recess (55) contain Smoking Pipe (56) and Pipe Cleaners (57). Observe Storage Chamber (50) and path of Keyway (51) to Keyway Endpoint (51*b*).

FIG. 4: Profile of Storage Chamber Cover (43) including Cover Concavity (43*a*). Cover Concavity (43*a*) is an improvement over previous devices and is intended for a thumb, finger, or other means to urge the Storage Chamber Cover (43) to an open position apropos the apparatus storage chamber.

FIG. 5: With the Storage Chamber Cover removed from the Keyway (51), this illustration of the lateral surface depicts the Storage Chamber (50), Keyway (51) surface, Keyway Endpoint (51*b*), Lateral Keyway Spring Hinge (44), Body (41), and Lid (42). Sectional Lines C-C and V-V are depicted.

FIG. 6: Top view along sectional line L-L of FIG. 3*a*, depicting the complementary fitting dovetail profile of both Storage Chamber Cover (43) and Keyway (51). Storage Chamber (50) and included Accessory Cavities (53) also in view.

Figure 7:
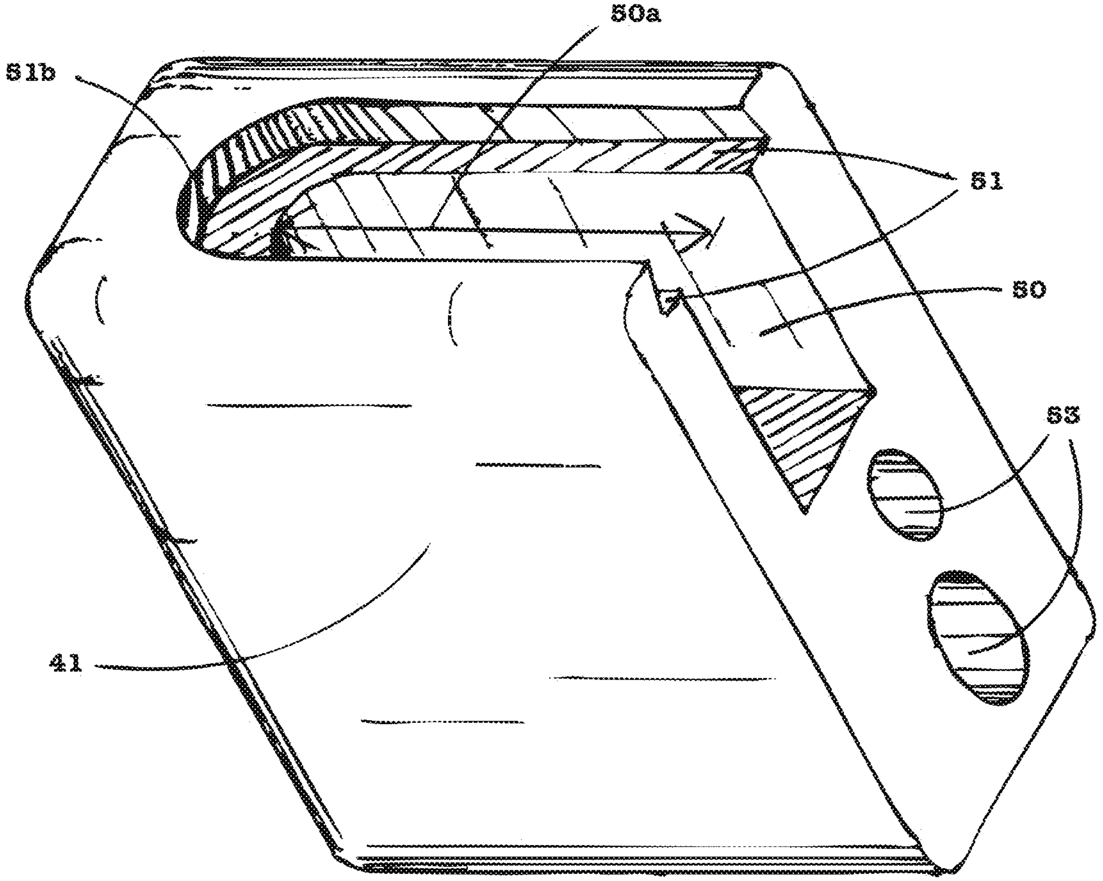
FIG. 7: Sectional isometric view along line V-V of FIG. 5.

FIG. 7: Sectional isometric view along sectional line V-V of FIG. 5. This lower half of Body (41) intends to show the Keyway (51) and Keyway Endpoint (51*b*) profile detail and position circumjacent to the Storage Chamber Opening (50*a*). The Storage Chamber Cover of previous views is to be received into the keyway. Also viewable are the Storage Chamber (50) and included Accessory Cavities (53).

Figure 8:
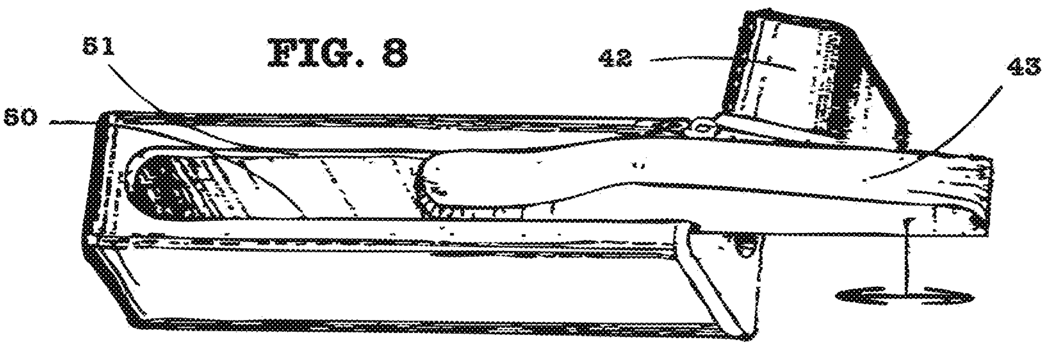
FIG. 8: Lateral view perspective portrays the apparatus with storage chamber cover in motion.

FIG. 8: Portrays the apparatus with Lid (42) in an open position and Storage Chamber Cover (43) in motion. Storage Chamber Cover (43) is slidably activated within the complementary profiled Keyway (51) to reveal Storage Chamber (50).

Figure 9:
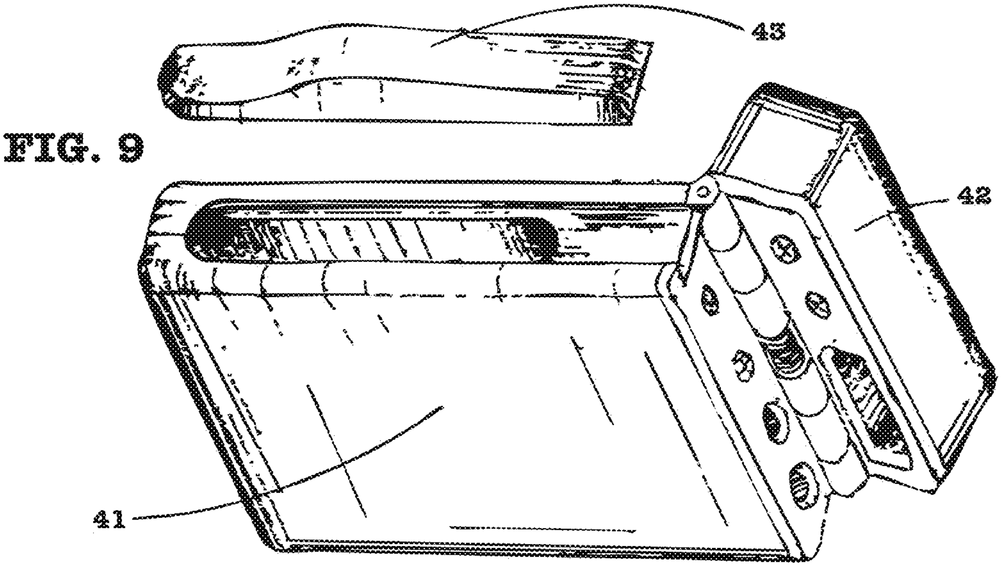
FIG. 9: Lateral view perspective portrays lid in an open position and storage chamber cover removed from body.

FIG. 9: Portrays Lid (42) in an open position and Storage Chamber Cover (43) removed from Body (41).

Figure 10:
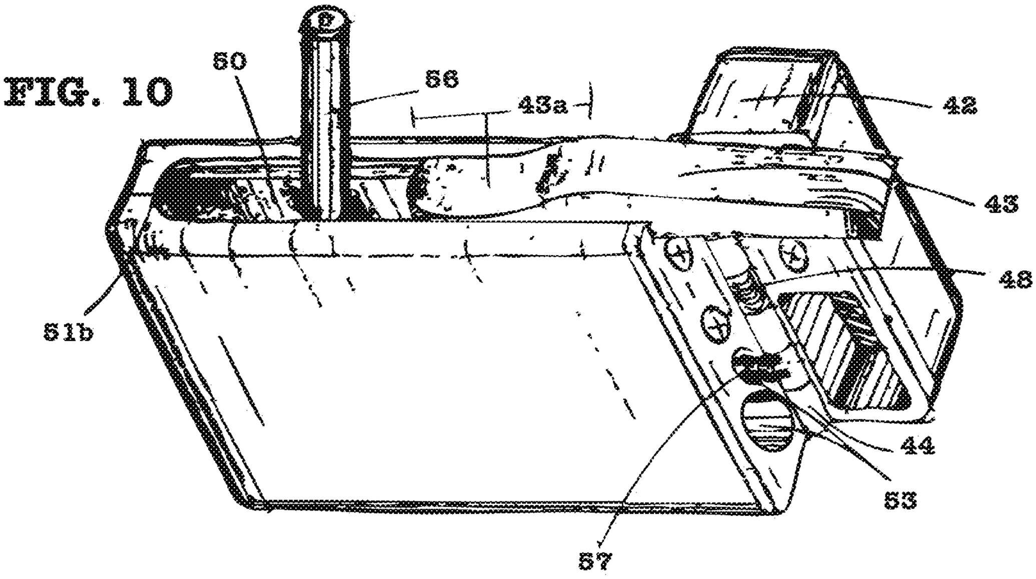
FIG. 10: Lateral view perspective of the preferred embodiment in full open position emplaced comparatively as upon a table top or surface.

FIG. 10: Presents a rendition of the preferred embodiment in full open position emplaced comparatively as upon a table top or surface. Lid (42) is open; Storage Chamber Cover (43) with Cover Concavity (43*a*) resides at a selected open position. Torsion Spring (48) of Lateral Keyway Spring Hinge (44) encourages a biasing effect against Storage Chamber Cover (43) resulting in a locked open position. Smoking Pipe (56) removed from included Accessory Cavity (53) and placed to load with product contained in Storage Chamber (50). Pipe Cleaners (57) visible protruding from included Accessory Cavity (53). Note Keyway Endpoint (51*b*).

Figure 11:
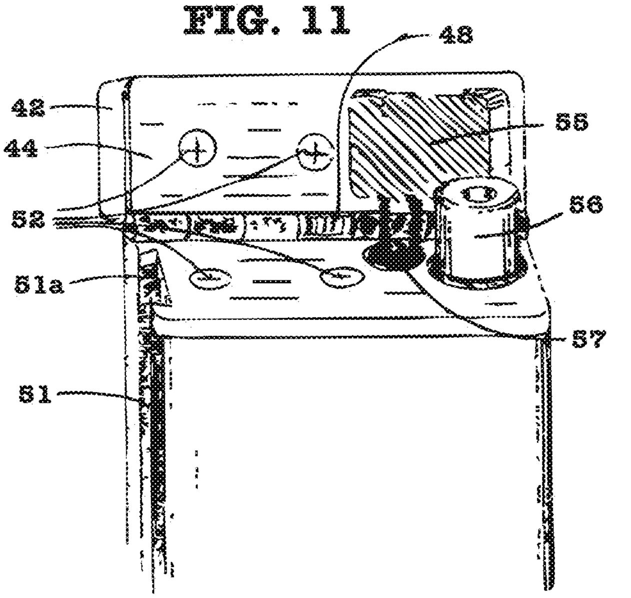
FIG. 11: Partial view of the preferred embodiment with lid in an open position, the Lateral Keyway Spring Hinge surfaces are exposed.

FIG. 11: Partial view of the preferred embodiment with Lid (42) in an open position; the Lateral Keyway Spring Hinge (44) surfaces are exposed to reveal Hinge Screws (52), included Recess (55), and Torsion Spring (48). Accessories included are Smoking pipe (56) and Pipe Cleaners (57) which are protruding from their respective included cavities. Keyway Opening (51*a*) on the hinge upper surface leads to Keyway (51) on the lateral surface.

Figure 12:
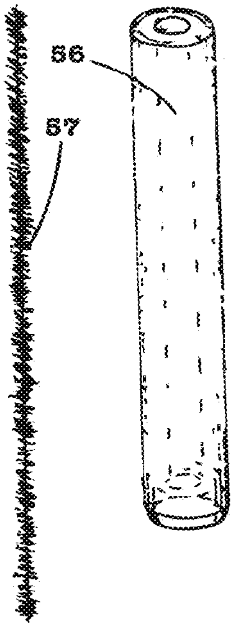
FIG. 12: View of accessories.

FIG. 12: Portrays accessories Smoking Pipe (56) and Pipe Cleaners (57). Such smoking pipe is preferably designed to have the appearance of a cigarette.

Describing the manner to utilize the apparatus: grasping the apparatus and fully opening Lid (42) in a pivoting manner (see FIG. 11) reveals, if included, Recess (55) and any accessories that may be protruding from any of the included Accessory Cavities (53); any or all of the accessories that may be included can be extracted if desired. Lid (42) may have a concavity (not pictured) to assist with opening of said lid. FIG. 12 displays examples of a pipe and pipe cleaner that may be included as accessories; any related or unrelated accessories may be sized and accommodated in appropriately sized cavities.

Keeping the Lid (42) in an open position and, referring to FIG. 8, reorienting the apparatus such that the Storage Chamber Cover (43) is in an up position, then placing thumb, finger, or other means upon Cover Concavity (43*a*) to slidably activate and urge Storage Chamber Cover (43) to a selected open position revealing Storage Chamber (50) permits a visual evaluation of the contents in Storage Chamber (50). A controlled release of the open Lid (42) until biasing, or wedging, against the open Storage Chamber Cover (43) culminates in a lid open, cover open arrangement that can be viewed in FIG. 8 and FIG. 10. The result: lid is locked open and the cover is wedged in place so the cover will not get lost as in some previous patent filings. This lid open, cover open arrangement holds itself open securely on its own and is a most important attribute to this disclosure.

Continuing with the lid open, cover open arrangement with the Storage Chamber Cover (43) in an up orientation, the apparatus may be placed upon a tabletop or surface of the like. Observing FIG. 10 demonstrates a Smoking Pipe (56) interposed with Storage Chamber (50); Smoking Pipe (56) ready to load with the contained product in the Storage Chamber (50). A phenomenon of this arrangement: the broader footprint attributed to the open Lid (42) profile of the apparatus and lower center of gravity due to the apparatus positioned on it's side greatly increases the inherent stability of the apparatus when placed upon a surface—another important and unforeseen attribute to this disclosure. Similar apparatuses over the years have failed to turn themselves into a device with augmented stability.

For those skilled in the art or perhaps having the use of only one hand, a single handed method becomes an invaluable procedure: with the preferred embodiment in a closed position and grasping the preferred embodiment (refer to FIGS. 8 and 10) in the palm of one's hand, and from the same hand—a thumb, finger, or other means upon Cover Concavity (43*a*) urges the Storage Chamber Cover (43) to an open position. As Storage Chamber Cover (43) exits Keyway (51) and urges upon Lid (42), an opening motion consequentially occurs with Lid (42); Storage Chamber Cover (43) continues to slide with the aforementioned urge while opening Lid (42) to an open position. Once the Storage Chamber Cover (43) is in a desired open position, the apparatus may be set upon a tabletop or surface of the like. The apparatus again demonstrates the Lid (42) open, Storage Chamber Cover (43) open position as described previously and illustrated in FIGS. 8 and 10, holding itself open along with increased stability when placed upon a surface, the basic essence of this disclosure.

Closing the preferred embodiment from the lid open, cover open position requires the enthusiast to slightly pivot further open Lid (42), releasing the wedging action upon Storage Chamber Cover (43). The Storage Chamber Cover (43) can now be slidably received within Keyway (51) until reaching Keyway Endpoint (51*b*). Any included accessories may be returned to their respective cavities. Lid (42) is allowed to close on its own by virtue of the spring hinge and the apparatus is now securely closed; another significant attribute.

In some instances, Storage Chamber Cover (43) may be fully removed (FIG. 9) for any purpose. Once removed, the cover can assist with loading, tamping, stirring, and unloading any product located in the storage chamber. A worthwhile option to some is a window of clear plastic or glass located on the body for viewing product inside the Storage Chamber located beneath Storage Chamber Cover (43), see FIG. 2*a*.

Figure 13:
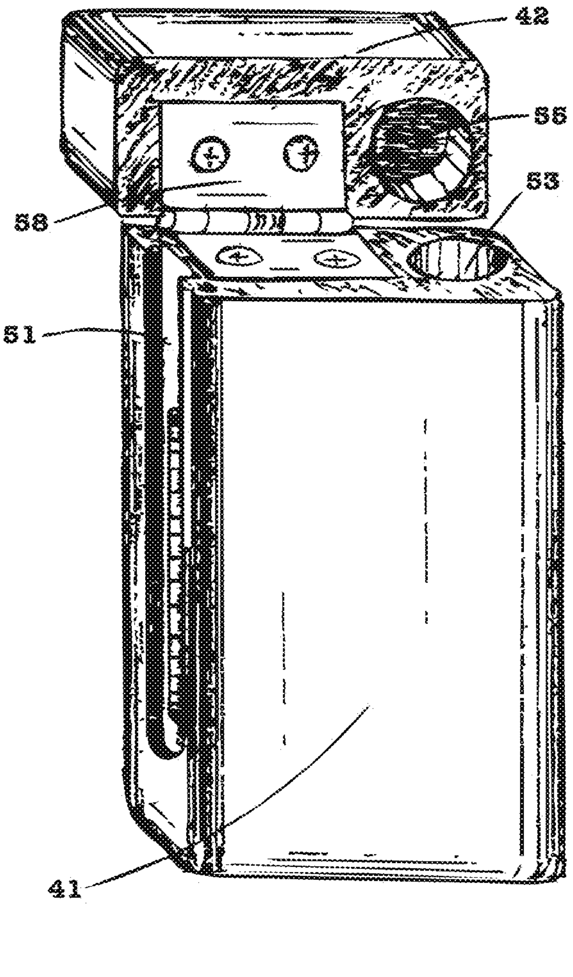
FIG. 13: View of the embodiment utilizing a common stock spring hinge in place of the preferred spring hinge embodiment.
Figures 14, 14A:
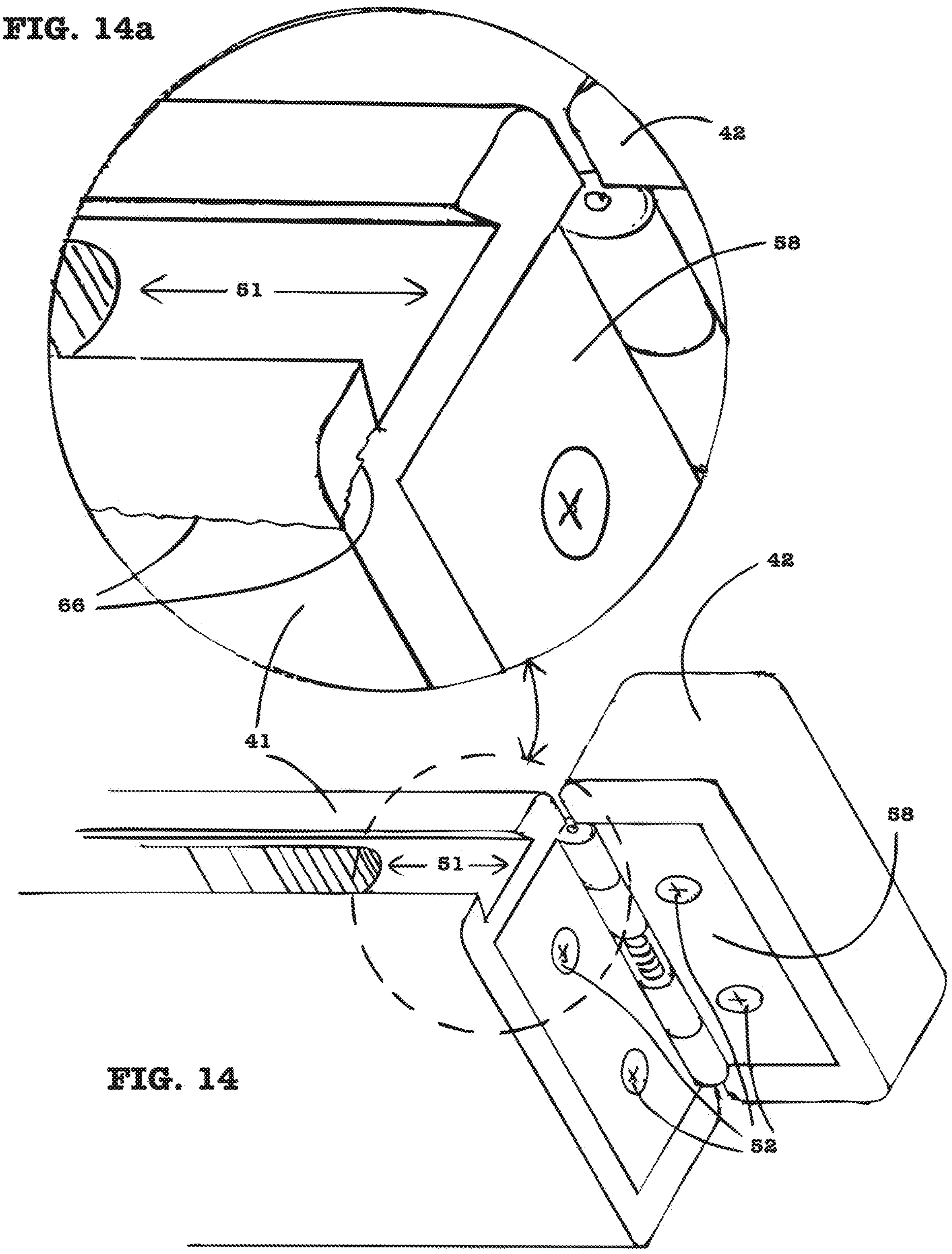
FIG. 14: Partial view of the embodiment utilizing a common stock spring hinge, no accessories included.
FIG. 14*a*: Enlargement of a portion of FIG. 14 showing material failure.
Figure 15:
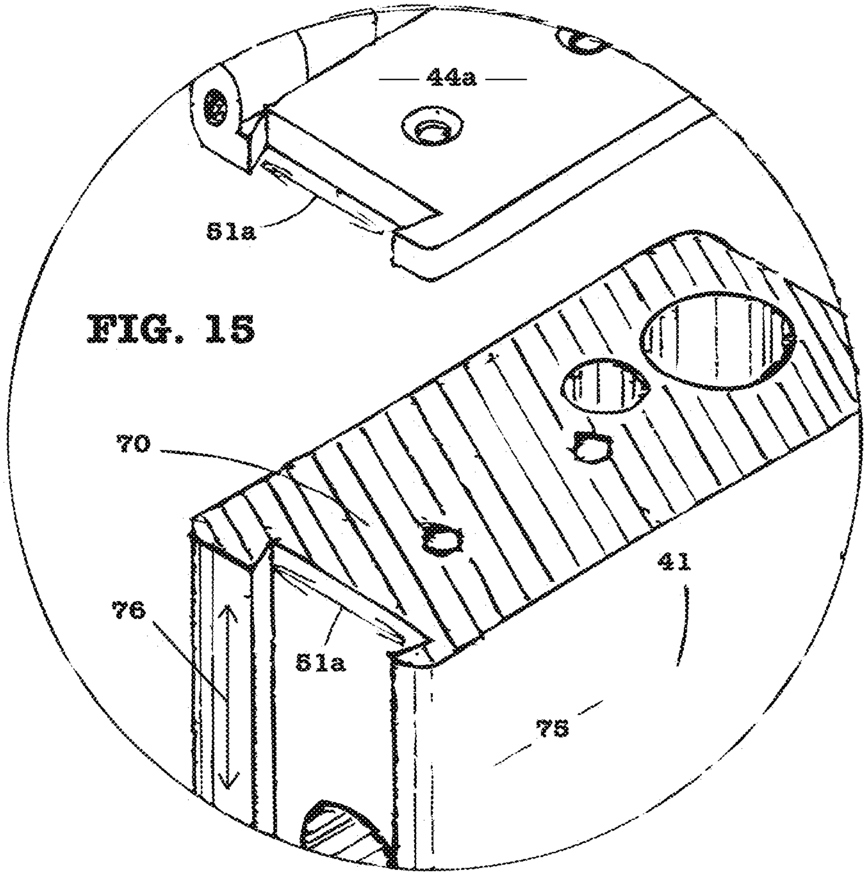
FIG. 15: Enlargement of a portion of FIG. 1.

The spring hinge that connects the body and lid together has two scenarios in this disclosure: the Lateral Keyway Spring Hinge assembly described as part of this patent disclosure and a Traditional Spring Loaded Butt Hinge (58) assembly as seen in FIG. 13 with Storage Chamber Cover removed; either one is instrumental to this disclosure. If utilizing the Traditional Spring Loaded Butt Hinge assembly: the Keyway (51), any included Accessory Cavity (53) located in Body (41), and any included Recess (55) located in Lid (42) are nonetheless machined into the apparatus as seen in FIG. 13. FIG. 14 is a partial view of the apparatus without the storage chamber cover in place and utilizing a Traditional Spring Loaded Butt Hinge (58); noted are the Body (41), Lid (42), Hinge Screws (52), and Keyway (51). The apparatus portrayed in FIG. 14 is fashioned with no accessory or recess openings. These embodiments portrayed in FIGS. 13 and 14 utilizing a common spring-loaded hinge in place of the Lateral Keyway Spring Hinge viewed previously, although effective, result in a less durable apparatus. FIG. 15: Enlarged view of a portion of FIG. 1 showing a critical section and the appetency for a steadfast Hinge Leaf (44*a*) with Keyway Opening (51*a*) matching to Keyway Opening (51*a*) on Body (41). The intention is to strengthen the area on the Body (41) consisting of: Keyway Opening (51*a*) on Body Side Lateral Surface (76), Body Upper Surface (70), and Body Front Lateral Surface (75). Damage to the body's keyway as a consequence of brittle or vulnerable material, or misuse, can occur without the Keyway Opening (51*a*) in Hinge Leaf (44*a*) giving reinforcement to this area.

An example of damage occurring as a consequence of utilizing a traditional spring loaded hinge not endowed with the reinforcing properties of the Lateral Keyway Spring Hinge can be seen in the enlarged view shown in FIG. 14*a*: Traditional Spring Loaded Butt Hinge (58) connecting Body (41) to Lid (42); a Fracture (66) has developed along the weakest section of the Body (41) near Keyway (51) as a result of Lid (42) biasing against Storage Chamber Cover (not pictured) in an open position. The Lateral Keyway Spring Hinge, featuring the Keyway Opening further described in FIGS. 16-20, solves this problem situation by providing a shoulder to bear the strain of any consequential force generated during use of the apparatus.

Figure 16:
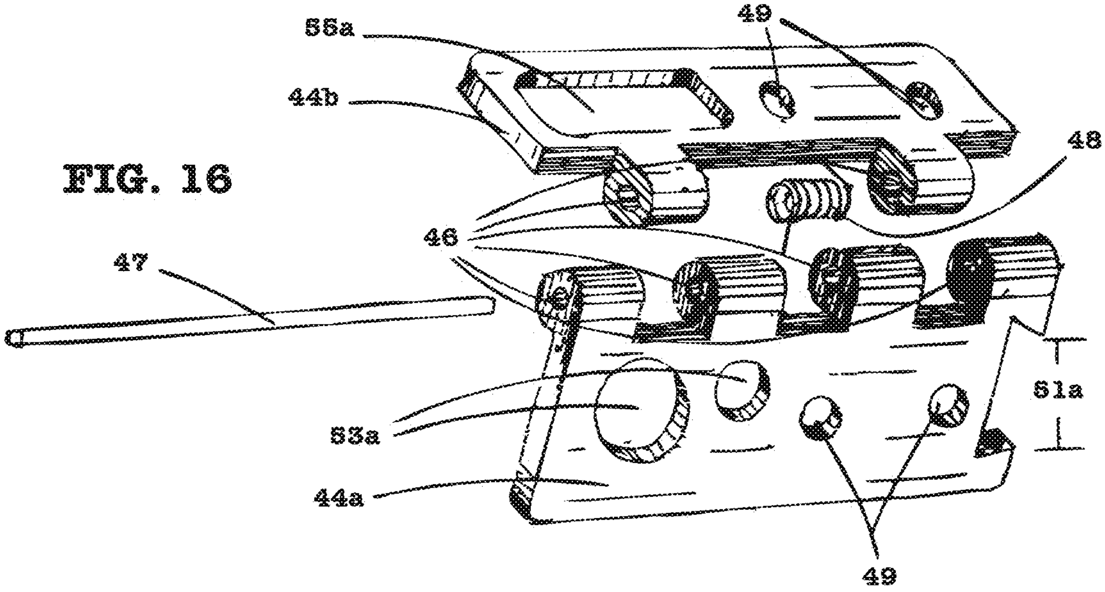
FIG. 16: Exploded perspective portrays the Lateral Keyway Spring Hinge components.

Turning to FIG. 16 to observe Hinge Leaves (44*a*&44*b*) with hinge Axle Holes (46), and Axle (47), these components are manufactured of a suitable metal or synthetic material and further fashioned to include Screw Holes (49) and most importantly the Keyway Opening (51*a*). Any number, including zero, of Accessory Cavity Openings (53*a*) and Recess Openings (55*a*) may be sized and machined to be included into the Hinge Leaves (44*a*&44*b*) and assembled with Torsion Spring (48) positioned around Axle (47) to create the Lateral Keyway Spring Hinge.

Assembled Lateral Keyway Spring Hinge (44) as viewed in FIGS. 1, 17, & 18 discerns the Keyway Openings (51*a*). Lateral Keyway Spring Hinge (44) may be modeled with one or multiple Keyway Openings (51*a*) as seen in FIGS. 17-20. This disclosure aspires to emphasize that the Keyway Opening (51*a*) introduced on Lateral Keyway Spring Hinge (44) is an important attribute adding strength to a critical area of the apparatus.

FIG. 17: Viewing the preferred embodiment of the Lateral Keyway Spring Hinge displays two included Accessory Cavity Openings (53*a*), Torsion Spring (48), Screw Holes (49), included Recess Opening (55*a*). Hinge Lateral Surface (77) encompasses the hinge leaves; Keyway Opening (51*a*) located along Hinge Lateral Surface (77) is an important attribute that ensures strength and dependability.

FIG. 18: Another embodiment of the Lateral Keyway Spring Hinge with one included Accessory Cavity Opening (53*a*). Hinge Lateral Surface (77) is depicted encompassing the hinge leaves. Torsion Spring (48), Screw Holes (49), included Recess Opening (55*a*) are depicted. Keyway Opening (51*a*) along Hinge Lateral Surface (77) is the important attribute.

FIG. 19: Primary Multiview of the Lateral Keyway Spring Hinge showing Torsion Spring (48), Screw Holes (49), included Accessory Cavity Opening (53*a*), and included Recess Opening (55*a*). Hinge Lateral Surface (77) encompasses the hinge leaves. The Keyway Opening (51*a*) is the important attribute.

FIG. 20: Top view of an open Lateral Keyway Spring Hinge ancillary embodiment showing multiple Keyway openings (51*a*) along the Hinge Lateral Surface (77). Also depicted are Torsion Spring (48), Screw Holes (49), included Accessory Cavity Opening (53*a*), and included Recess Opening (55*a*).

Concerning the common Spring Hinge with the added Keyway Opening or Keyway Openings, the design of this article of manufacture is dictated primarily by the function of the article, therefore ineligible for a design patent under 35 U.S.C. 171. Alternative hinge designs include different biasing properties such as magnets or different hinge characteristics as an alternative to screw fasteners. Also, the hinge can instead be mounted at an angle with respect to the lid and body much like a flip-top pack of cigarettes wherein the lid as it is opened exposes a greater length of any protruding accessories.

Figure 21A:
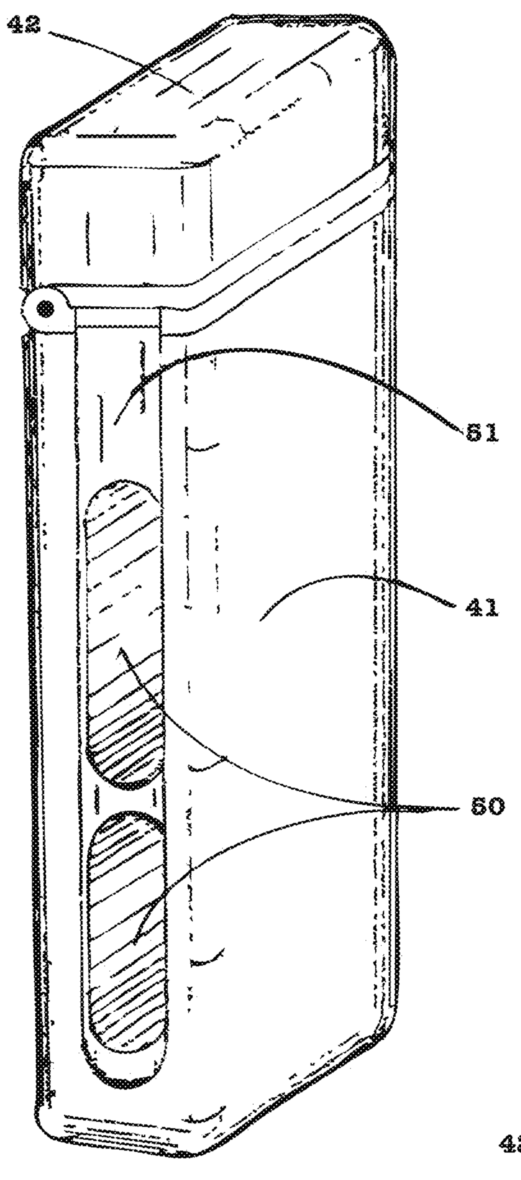
FIGS. 21*a*-21*d*: Ancillary embodiment perspectives.

FIG. 21*a*: Portrays two Storage Chambers (50) in the preferred embodiment. Body (41), Lid (42), and Keyway (51) in view; Storage Chamber Cover is removed.

Figure 21B:
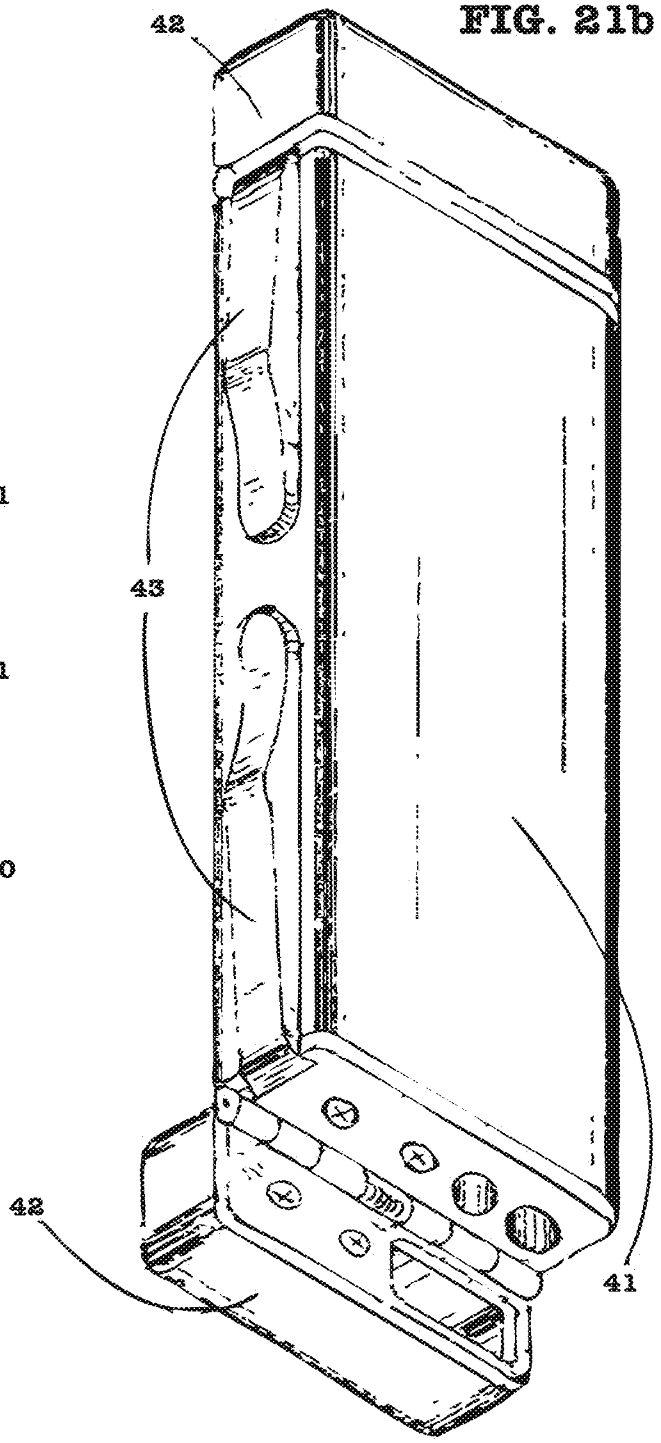
Figure 21C:
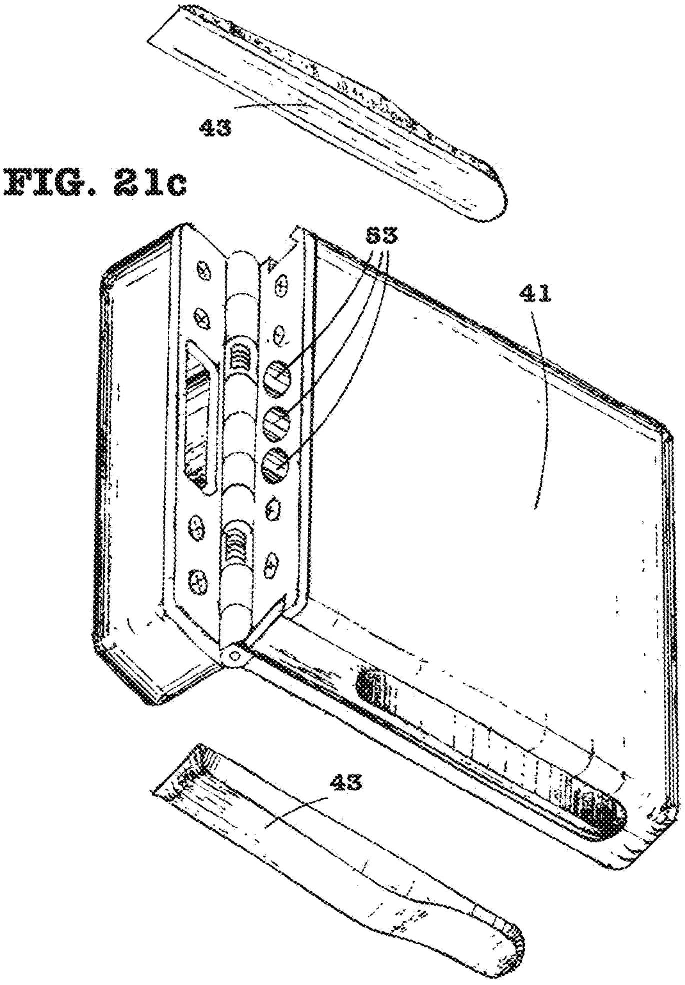

FIGS. 21*b* & 21*c* represent ancillary embodiments of double Storage Chamber Cover (43) design possibilities: a Body (41) with opposing Lids (42) in FIG. 21*b*; and a Body (41) with opposing Storage Chamber Covers (43) and multiple Accessory Cavities (53) in FIG. 21*c*.

Figure 21D:
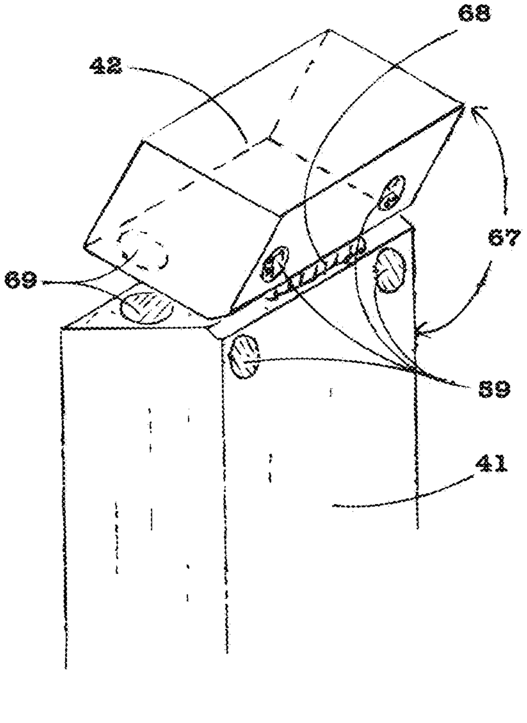

FIG. 21*d*, another ancillary embodiment of the apparatus, is a partial isometric view distinguishing the use of magnets (59,69) contributing a similar biasing effect to that of a spring loaded hinge. Storage chamber lid is not pictured. Hinge (68) defines the path of travel, or Sweep Path (67), for Lid (42) hingedly connected to Body (41). The exterior of a closed apparatus contains magnets within the Sweep Path (67) facing each other in a manner to repel each other as the Lid (42) is opened. An increase in the repelling force from Repelling Magnets (59) will be felt consequentially as the Lid (42) is opened. Viewed as an open apparatus, magnets again are located within the sweep path on the Lid (42) lower surface and Body (41) upper surface; Attracting Magnets (69) ensure Lid (42) remains closed when desired. Magnets may be added to the sliding cover to have a similar effect.

Figure 22:
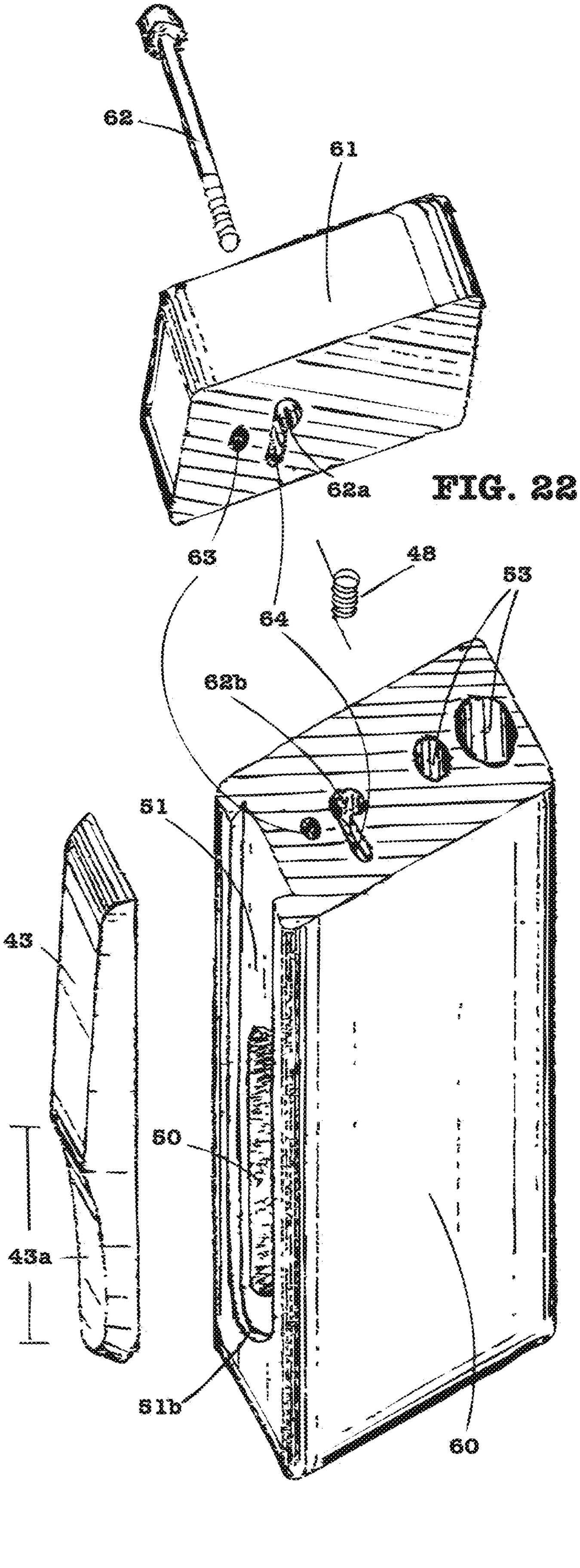
FIG. 22: Twist Top embodiment exploded view.

A twist top version is possible while maintaining essentially the same body configuration with sliding cover. FIG. 22 exploded view displays Body (60), Keyway (51), Keyway Endpoint (51*b*), Storage Chamber (50), Magnets (63), Cap Screw Borehole (62*a*), and Cap Screw Pilot Hole (62*b*). Also, any included Accessory Cavities (53) are bored to a width and depth to suit the intended accessory. Storage Chamber Cover (43) with Cover Concavity (43*a*) is profiled to complement and be slidably received in the Keyway (51) as in the preferred hinged embodiment. The Cap Screw (62) described herein has variations in form and design; the intention is to ascertain a pivot characteristic.

Swivel Lid (61) has a lower surface featuring Magnet (63), Cap Screw Borehole (62*a*), and Torsion Spring Cavity (64).

Torsion Spring (48) is sized to encompass Cap Screw (62) and occupies the Torsion Spring Cavity (64) machined into the Body (60) upper surface and Swivel Lid (61) lower surface in a manner to provide accommodation and confinement for circumference and arms of Torsion Spring (48).

Magnets (63) on Body (60) upper surface and Swivel Lid (61) lower surface are mounted in a manner to attain maximum attraction during a closed position.

Cap Screw (62) is sized to provide rigid support when anchored in Body (60). Cap Screw (62) acts as an axle for Torsion Spring (48) and Lid (61).

This twist-top disclosure differs from other twist-top versions patented. When the twist top embodiment is being manipulated and utilized, circumvolving the Lid (61) actuates the Torsion Spring (48), engaging between Lid (61) and Body (60). Circumvolving the Lid (61) far enough to allow Storage Chamber Cover (43) to move to a selected open position and then releasing the Lid (61), the apparatus displays the same essential wedging action, namely the lid biasing against cover (in the cover open position), as exhibited in the spring hinge disclosures.

Figure 23:
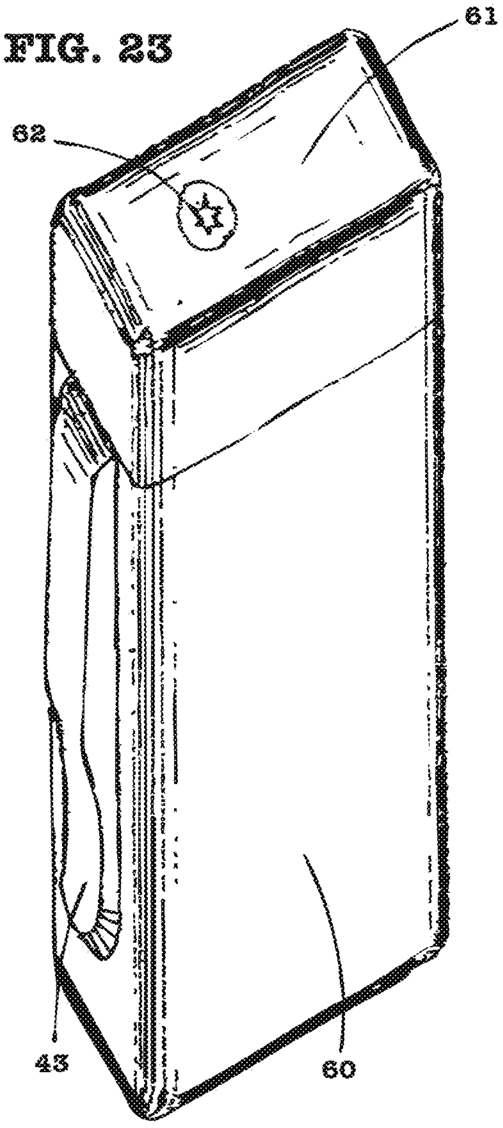
FIG. 23: Twist Top embodiment.

FIG. 23 presents the assembled apparatus in a closed position in which Swivel Lid (61) is not hingedly attached to Body (60) but utilizes Cap Screw (62) leading through Swivel Lid (61) and fastened within Body (60). Swivel Lid (61) pivots around Cap Screw (62). Storage Chamber Cover (43) also depicted.

Figure 24:
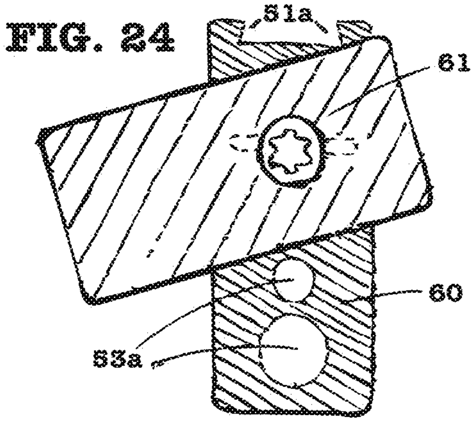
FIG. 24: Overhead Twist Top embodiment view.

The overhead view in FIG. 24 depicts Swivel Lid (61) pivoted to an open position over Body (60) to expose the Keyway Opening (51*a*) and included Accessory Openings (53*a*). Storage chamber cover is removed and not pictured.

FIG. 25: Partial view of Body (60) upper surface. Dovetail notched Keyway (51), Accessory Cavities (53), Magnet (63), Torsion Spring (48), and detailed view of Torsion Spring Cavity (64) adjacent to Cap Screw Pilot Hole (62*b*).

FIG. 26 displays Twist Top Apparatus in an open position with storage chamber cover not pictured; Swivel Lid (61) pivoting around Cap Screw (62). Body (60) includes Accessory Cavity (53), Storage Chamber (50), and Keyway (51).

Thus, it can be appreciated that the above-described embodiments are not limitations of the disclosed invention. New technology, including printing devices to vary materials and manufacture, may emerge to offer comparable alternatives or substitutes. Moreover, having described the preferred embodiments in the foregoing specification, it is to be realized that the optimum dimensional relationships for the parts and cavities of the invention include variations in size, form, function, assembly, accessory quantities, hinge characteristics, and use; these aforementioned intricacies are deemed intuitively apparent to one skilled in the art and may be made without departing from the true spirit and scope of the invention as claimed. Modified forms of the present invention performed by others skilled in the art to which the invention pertains will be considered infringements of this invention when those modified forms fall within the claimed scope of this disclosure.

What I claim as my invention is:

1. A portable flip top storage apparatus comprising:

a body including an upper surface embodying one or two keyway openings corresponding to one or two keyways located along any lateral surface, said keyway has a dovetail profile, furthermore said keyway encompasses at least one adjacent lateral storage chamber opening leading to a corresponding lateral storage chamber therein, said keyway has an endpoint, said keyway is configured to slidably receive an engageable cover having a complimentary profile of said keyway, wherein said engageable cover may include a concavity purposed to facilitate opening of said cover, and said body upper surface may include one to three cavity openings leading to any corresponding cavity sized appropriately for an intended accessory, and a lid including a lower surface by a hinge connected to said body upper surface for selective movement in directions away and toward said body upper surface between an open position, in which said body upper surface and said lid lower surface are exposed, and a closed position, in which said body upper surface and said lid lower surface are unexposed; whereby said hinge has a biasing aspect coercing said lid to a closed position, said biasing aspect is a spring or magnets; and said lid lower surface may include one appropriately sized recess aligning with any said cavity openings located on said body upper surface; and said lid and said body may contain a plurality of appropriately sized magnets located in the sweep path of said lid purposed to attract or repel upon each other.

* * * * *